(No Model.)

L. L. PAINTER.
COMBINED TEA KETTLE AND STILL.

No. 577,267. Patented Feb. 16, 1897.

WITNESSES:
Edward Rowland
Wm. H. Shaw

INVENTOR
Louise L. Painter,
BY D. A. Carpenter,
ATTORNEY

United States Patent Office.

LOUISE L. PAINTER, OF SAG HARBOR, NEW YORK.

COMBINED TEAKETTLE AND STILL.

SPECIFICATION forming part of Letters Patent No. 577,267, dated February 16, 1897.

Application filed January 24, 1896. Serial No. 576,652. (No model.)

*To all whom it may concern:*

Be it known that I, LOUISE L. PAINTER, of Sag Harbor, in the county of Suffolk and State of New York, have invented a certain new and useful Improvement in a Combined Teakettle and Still, of which the following is a full, clear, and exact description, reference being made to the accompanying drawings, forming part of this specification.
This invention relates to improvements in the construction and in the arrangement with respect to each other of a teakettle and apparatus whereby steam is condensed and the distilled water collected; and the invention consists of a combined teakettle and still constructed as hereinafter described and claimed.

Figure 1:
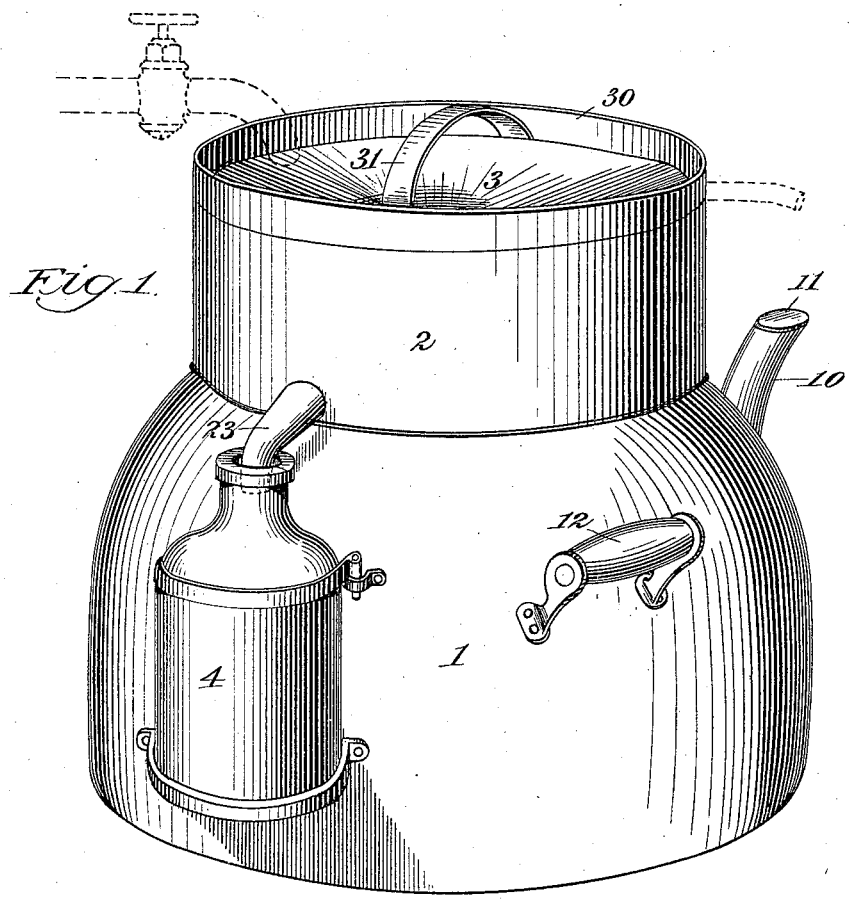
Figure 2:
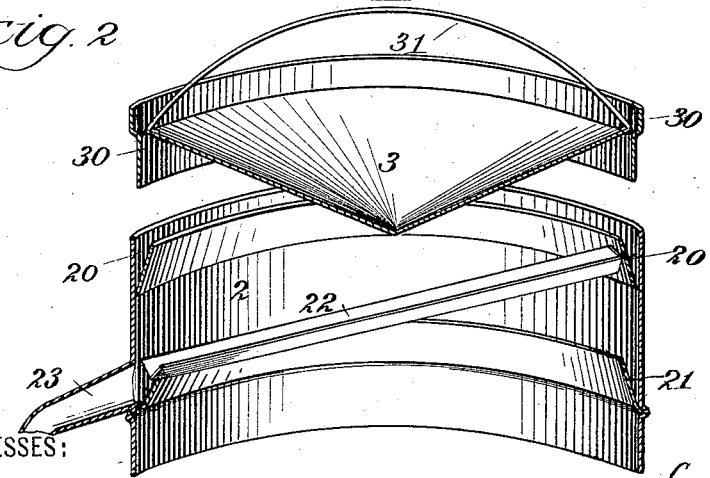

On the accompanying sheet of drawings, Figure 1 is a perspective of the combined teakettle and still, and Fig. 2 a vertical section of the head or upper part thereof.

Similar reference-numerals designate like parts in both views.

This invention is intended to perform both the functions of a teakettle and those of a still at the same time. It is adapted to supply the want of a distilling apparatus less expensive and cumbersome than an ordinary still, and is particularly useful, for example, to provide a family with pure water for drinking.

The body 1 of this utensil is that of a common teakettle. On the spout 10 is a lid 11, and on the sides of the body are handles 12, only one handle being shown by the drawings, or else a bail is attached to it instead of the handles. The head 2 is mounted on the body of the kettle, as represented in Fig. 1. It may be secured permanently to the body or may be detachable therefrom. It contains a trough 20 near the top and another trough 21 near the bottom, each of which troughs extends entirely around the interior of the head. It also contains a straight trough 22. One end of this trough is lower than the other, and its lower end rests on the edge of the trough 21. Its opposite end is fastened to the side of the trough 20, but there is no opening into it from the upper trough. It might be fastened to the side of the head under the trough 20. The trough 21 communicates with a spout 23, that projects from the head and inclines downward to its mouth, as shown.

The head is provided with a removable cover. This comprises the central portion 3, the rim 30, and a handle 31. The portion 3 is a hollow cone, its base being uppermost. The rim 30 is secured to the cone at its base, and preferably extends on opposite sides of the plane that contains the base of the cone. The rim fits in the top of the head 2, between the sides of the trough 20, when the cover is in its proper position on the head, and the apex of the cone 3 is then directly above the trough 22.

A bottle 4 is secured by holding devices from which it may be easily removed on the side of the body 1 under the spout 23, as shown in Fig. 1.

Before this distilling apparatus is put into use the trough 20 and the cone 3 of the cover are filled with cold water. The water in the trough 20 is to prevent the steam from escaping between the cover and the sides of the head. It would accelerate the condensation of the steam if a constant stream of cold water should be made to flow through the cone. That might be done by directing a head of cold water into the cover on one side and out of it on the other by means of a pipe and faucet and a discharge-pipe arranged as indicated by dotted lines in Fig. 1. When steam is generated in the kettle, and, ascending into the head, comes in contact with the cool surface of the cone 3 and the sides of the head, it is condensed thereon, and the distilled water then trickles down the sides of the head into the channel formed by the trough 21 and down the sides of the cone to its apex. The water that reaches the apex of the cone falls from it into the trough 22 and is conveyed by that conductor to the channel 21. From the channel 21 the distilled water flows through the spout 23 into the bottle 4.

It is obvious that the head 2 may constitute an attachment to be applied to the body of any teakettle if it is made at the bottom to fit in the opening which is usually closed by the cover of the kettle.

Having thus described my invention, what I claim as new, and desire to secure by Letters Patent, is—

A combined teakettle and still comprising: the body 1 provided with a spout 10 on which is a lid 11; a bottle 4 and means whereby it is supported on one side of the body; and the head 2 mounted on the body 1, and having a removable cover which constitutes also the cover of the teakettle and whose central portion is a cone 3, the head containing a channel 21 near the bottom, and a trough 22, and having a spout 23 communicating with both the channel 21 and the trough 22; whereby condensation of steam generated in the body of the teakettle is procured on both the conical and cylindrical surfaces within the head, and the distilled water formed on both those surfaces is conveyed to and collected in a receptacle, while the teakettle proper is utilized in the capacity of an ordinary teakettle, substantially as described.

LOUISE L. PAINTER.

In presence of—
F. H. PALMER,
EVERETT L. TINDALL.